July 5, 1927.
J. LE VALLEY
AIR COMPRESSOR VALVE
Filed July 23, 1925
1,634,949
2 Sheets-Sheet 1
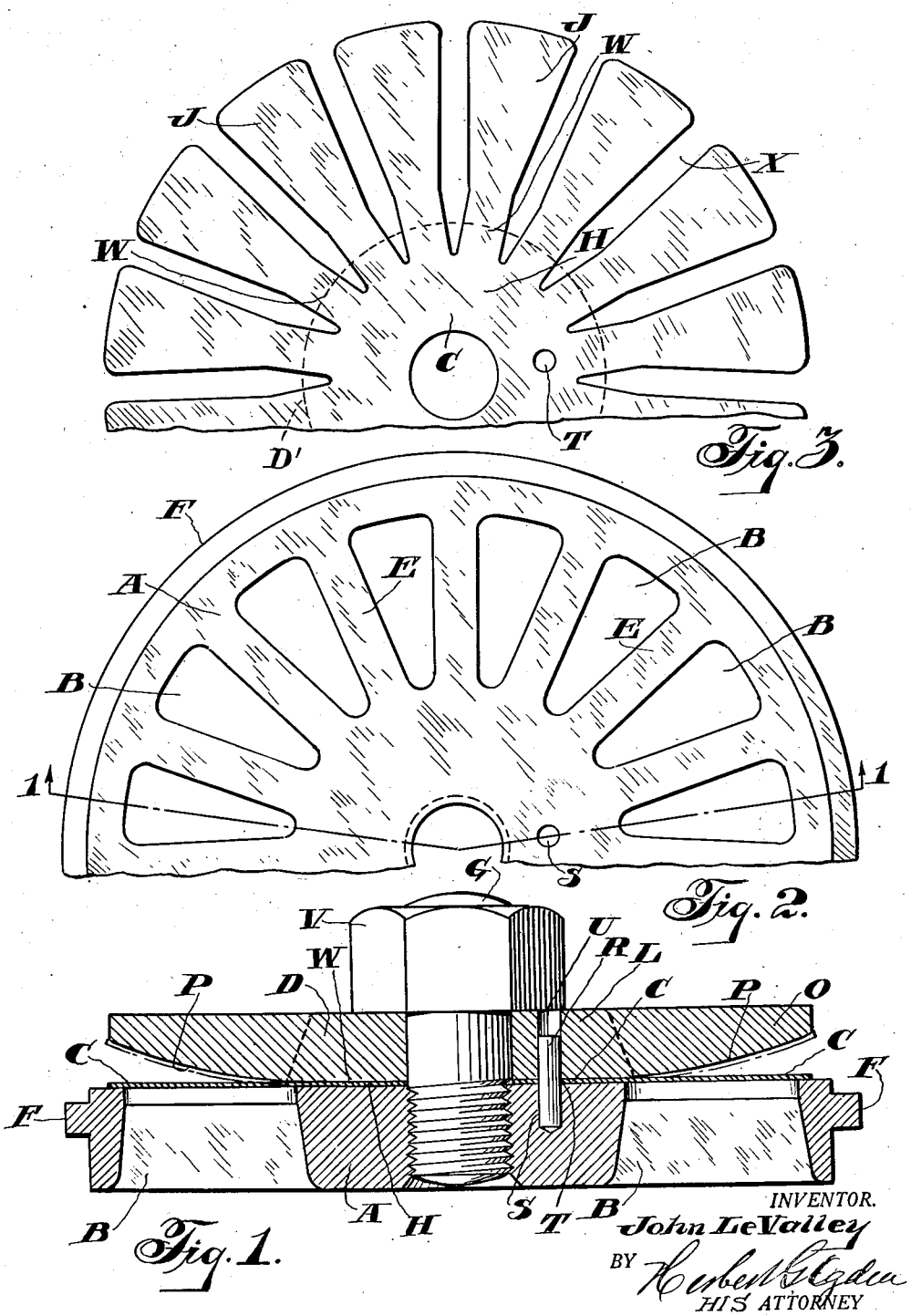
INVENTOR.
John LeValley
BY
HIS ATTORNEY July 5, 1927.

J. LE VALLEY

AIR COMPRESSOR VALVE

Filed July 23 1925

1,634,949

2 Sheets-Sheet 2

INVENTOR.
John LeValley
BY
HIS ATTORNEYS.

Patented July 5, 1927.

1,634,949

UNITED STATES PATENT OFFICE.

JOHN LE VALLEY, OF PAINTED POST, NEW YORK, ASSIGNOR TO INGERSOLL-RAND COMPANY, OF JERSEY CITY, NEW JERSEY, A CORPORATION OF NEW JERSEY.

AIR-COMPRESSOR VALVE.

Application filed July 23, 1925. Serial No. 45,449.

This invention relates to valves and more particularly to the type of valve especially adapted for use in compressors, pumps, and the like. More specifically, the invention relates to flexible valves which are adapted to be lifted by the pressure of the fluid being pumped and to be seated thereby.

An object of this invention is to construct a silent, durable and efficient valve. Another object of this invention is to utilize a maximum of the area of the valve seat as is commensurate with strength to withstand the pressure thereon. Another object of the invention is to arrange the ports in the valve seat so as to provide large port and lift areas for the valve. Still another object of the invention is to give flexibility, strength, and durability to the valve. Another object of the invention is to reduce to a minimum the shock to the valve on opening and closing and to enable the valve to operate in comparative silence.

Other objects and advantages of the invention will be in part obvious and in part pointed out hereinafter.

Figures 5, 6:
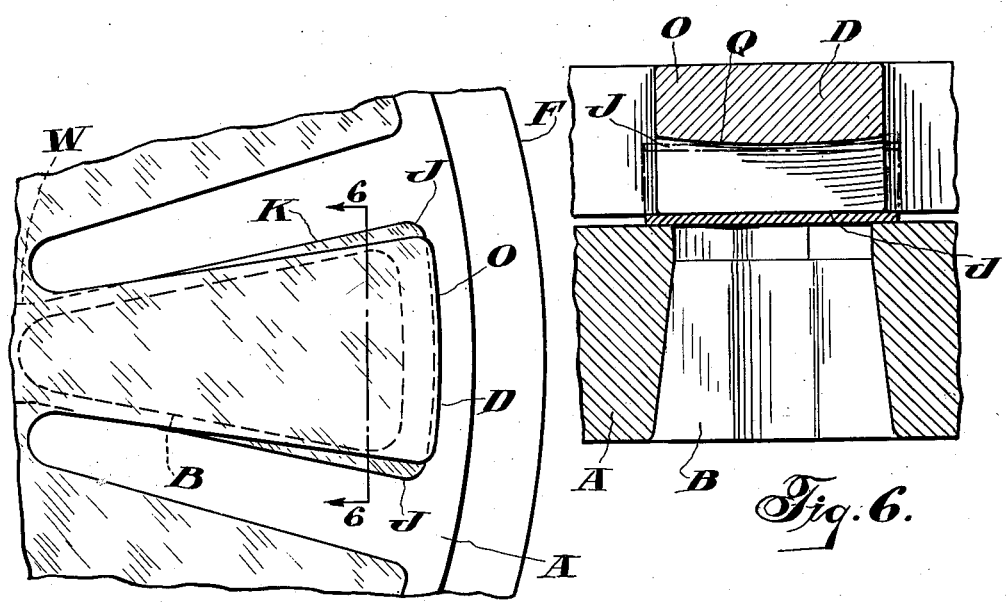
Figure 4:
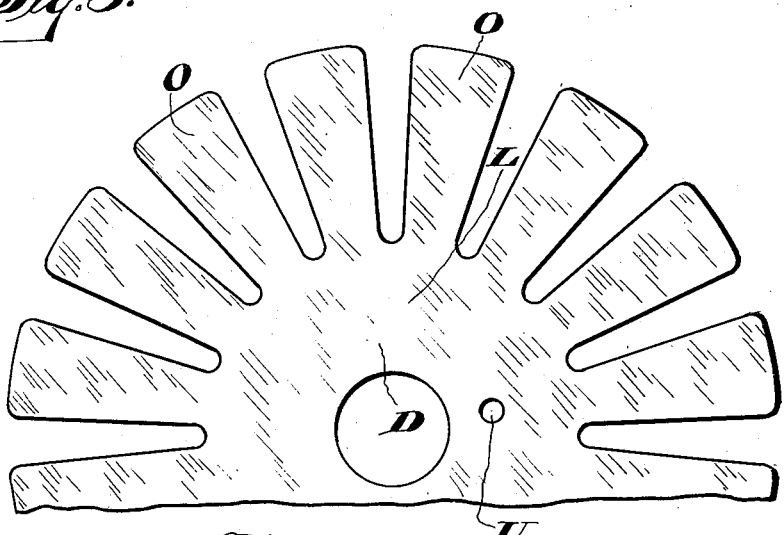

In the drawing forming part of the specication and in which similar reference characters refer to similar parts, Figure 1 is a cross section of a valve assembly including a seat, valve, and stop plate taken along the line 1—1 looking in the direction of the arrows, Figure 2 is a plan view of a portion of the valve seat, Figure 3 is a plan view of a portion of the valve, Figure 4 is a plan of a portion of the stop plate, Figure 5 is an enlarged plan view of a portion of the valve assembly, and Figure 6 is a cross section of the valve assembly taken along the line 6—6 looking in the direction of the arrows.

Referring to the drawings, the valve assembly includes a circular valve seat A provided with a plurality of ports B, a valve C and a valve stop or stop plate D adapted to hold the valve C onto the seat A.

The ports B are similar and each is an elongated hole in the seat A extending generally radially from the central portion of the seat, the ports being separated from each other by sections E of the seat A. The sections E are preferably of uniform thickness and width to provide sufficient strength in the valve seat from the outer edge to the center to withstand pressure of the jack screw or other suitable means for maintaining the valve seat in place in the cylinder. The width of the sections E also provides space between the valve fingers to make the lift area effective. The valve seat A may be provided with a laterally extending flange F on its perimeter to cooperate with a flanged aperture in the cylinder (not shown) to make an airtight seal. The valve seat A is in this instance adapted to be held within the cylinder by means of a jack screw (not shown) pressing preferably against the center as for instance on top of the stud G holding the valve assembly together. However, any suitable means may be employed to hold the valve seat in place in the cylinder. The radiating sections E are adapted to transfer the stress from the center of the valve seat A to the perimeter at the flange F. The strength of the valve seat A is therefore sufficient in every section to stand the stresses put upon it.

The valve plate C is provided with a central disc-like body portion H of less diameter than the central portion of the valve seat, from which flexible fingers J radiate, each finger J being free at its outer end and adapted to cover a port B, overlapping the edges slightly as at K, Figure 5. The stop plate D is likewise provided with a solid central clamping portion L and fingers or arms O adapted to project over and lie opposite the fingers J of the valve. The valve plate C is clamped centrally on the seat and outwardly beyond the bases of the valve fingers J. The sides of the arms O may be radial and their lower or inner faces P curve outwardly from a point outside or radially beyond the root of the valve fingers J in a curve preferably circular so that as the valve fingers J are pressed upwardly or away from the valve seat A by the pressure of the fluid passing through the ports B, the curvature which they assume on rising to contact with the stop plate arms is the same as the curvature of the lower faces of the stop plate arms. This is due to the fact that the outer ends of the valve fingers are free and unrestrained, so that the fingers may adjust themselves to the curvature of the stop plate fingers or arms with a wrapping contact and fold or unfold along the arms without shock.

The lower faces of the stop plate arms O are preferably not transversely straight. As shown in Figure 6, the lower face Q of the arm O is transversely convexly curved or contoured so that as the valve finger J rises it contacts at the center line of the stop plate arm. The elasticity in the material of the valve finger J tends to disengage the finger from the stop plate arm O giving the valve finger J an initial movement away from the stop plate C. Any tendency of the valve fingers J to adhere to the stop plate arm O by suction is counteracted by the fact that there is substantially line contact between the valve fingers and the stop plate arms which permits the discharge pressure to act effectively on the upper face of the valve fingers at all times.

In operating pumping machinery, especially air compressors, lubricating oil is ordinarily ejected from the compressor with the air passing through the ports B. A coating of this oil forms on all parts of the apparatus exposed to the air current and unless the stop plate arms O be curved transversely, the valve fingers J will adhere to the stop plate arms O causing the valve fingers to lag at the beginning of the closing which results in excessive pressure differential on the valve fingers after they have begun to move toward the seat. Consequently the valve fingers would thereby be accelerated to an extremely high velocity and finish their closing movement at a velocity far in excess of that necessary if the start were not delayed. Thus, excessive shock, lessened durability, noise of operation and loss of efficiency are eliminated by the arrangement provided by this invention.

In assembling the valve, the proper position of the parts is assured by the use of one or more dowels R, there being an aperture S in the base A and corresponding apertures T and U in the valve C and stop plate D respectively to receive the dowels. A nut V cooperating with the stud G holds the stop plate D firmly onto the valve seat A, the valve C being interposed therebetween.

The central solid clamping portion L of the stop plate D is flattened at the center on its lower face over a portion of a diameter slightly in excess of the root diameter greater than the diameter of the central disk-like portion of the valve plate and preferably of the valve plate C and holds the entire area of the disk-like body portion H of the valve C rigidly and the bases W of the valve fingers J on the valve seat A. The object of clamping the entire areas of the disc-like portion H is to prevent any bending therein as the fingers J rise. Any movement in this portion of the valve will quickly cause the metal to break and in addition interfere with the free and independent movement of the valve fingers J. As shown in Figure 3 more particularly the fingers J are spatulate, that is, they widen to a maximum width near their outer ends and are joined to the central solid disc-like portion H by a relatively attenuated part of uniform width. This produces a maximum flexibility at and near the bases of the fingers. This is found beneficial to prevent breakage as will appear since the part of greatest bending is thus most flexible. The line along which the fingers are clamped by the stop plate D is shown in Fig. 3 by a dotted line D'. It is understood that all of that portion of each finger J beyond the line D' is free to bend within the limits of the seat A and the stop plate D, while that portion of the valve C within the line D' is clamped rigidly to the seat A. The area of contact between the stop plate D and the bases W of the valve fingers J thus extends beyond the innermost extremity of the slots X cut between the valve fingers so that a portion of the base W of each valve finger J is clamped in position and operates each finger independently. As the valve fingers J flex, there is a simple bend in each finger with no twisting caused by other fingers. They are so thus radially held so that they must return to the same seat continuously over the ports B. Consequently, no wear can result at the edges or ends of the valve fingers J or in the seat A by rubbing of the valve on the seat.

I claim:

1. A valve assembly including a valve seat having radially extending ports, a valve having a central solid portion with radially extending fingers adapted to cooperate with said ports, and a stop plate for said valve having radially extending fingers adapted to clamp the valve over an area extending outwardly beyond the bases of the valve fingers rigidly to the valve seat and curved on the lower faces to permit raising of the valve fingers and to limit bending thereof.

2. A valve assembly including a valve seat having radially extending ports, a valve having flexible fingers extending generally radially and adapted to cooperate with said ports, and a stop plate for said valve having radially extending fingers adapted to clamp the fingers to said valve seat outwardly beyond the bases of the valve fingers, said stop plate fingers being curved at their lower faces, to permit raising of the valve fingers and to limit bending thereof, and transversely curved also to prevent the valve fingers from adhering thereto.

3. A valve assembly including a valve seat having radially extending ports, a valve having flexible fingers extending generally radially and adapted to cooperate with said ports, and a stop plate for said valve having radially extending fingers adapted to clamp the valve fingers outwardly beyond their bases to the valve seat, the under faces of said stop plate being provided with a flat central portion for clamping the valve and a portion of the fingers, and an upwardly curved portion tangent to the outer periphery of the flat portion to permit limited lifting of the valve fingers.

4. A valve assembly including a circular valve seat provided with a plurality of similar elongated ports extending generally radially with respect to the center of the seat and having similar sections separating the ports, a valve having a central disc-like portion and flexible radiating fingers extending therefrom, each finger being adapted to cover a part of the valve seat, said fingers being of greater width at their outer ends as compared with their inner ends, and a stop plate adapted to clamp the valve fingers to the valve seat outwardly beyond the bases of the fingers whereby each finger is caused to bend independently of every other finger and is limited in its bending.

5. A plate valve comprising a flat valve seat having a central solid portion and radially extending ports, a thin flat metal valve plate formed with a central disc-like body portion of less diameter than the central solid portion of the valve seat and having radiating flexible fingers free and unrestrained at their outer ends and adapted to cooperate with said ports, a stop plate provided with a central clamping portion formed with an under flat clamping surface of greater diameter than the diameter of the central disc-like portion of the valve plate and having radial arms opposed to the valve fingers, and means for securing the valve parts together, whereby portions of the bases of the valve fingers as well as the entire area of the central disc-like body portion of the valve plate are firmly clamped between the seat and the stop plate, thus insuring that each finger operates freely and independently of every other.

6. A plate valve comprising a flat valve seat having a central solid portion and radially extending ports, a thin flat metal valve plate formed with a central disc-like body portion of less diameter than the central solid portion of the valve seat and having radiating flexible fingers free and unrestrained at their outer ends and adapted to cooperate with said ports, a stop plate provided with a central clamping portion formed with an under flat clamping surface of greater diameter than the diameter of the central disc-like portion of the valve plate and having radial arms opposed to the valve fingers, and means for securing the valve parts together, whereby portions of the bases of the valve fingers as well as the entire area of the central disc-like body portion of the valve plate are firmly clamped between the seat and the stop plate, thus insuring that each finger operates freely and independently of every other finger, the inner stop surfaces of said stop plate arms being longitudinally contoured outwardly on lines substantially tangent to the said central flat clamping surface of the stop plate and also convexly contoured transversely, so that the valve fingers adjust themselves to the longitudinal curvature of the arms with a wrapping contact along central longitudinal lines of contact and are prevented from adhering to the arms.

In testimony whereof I have signed this specification.

JOHN LE VALLEY.